Oct. 13, 1936. H. LEHMAN 2,056,943
COMBINED BEVERAGE CONTAINER AND SERVING TRAY
Filed Dec. 3, 1935
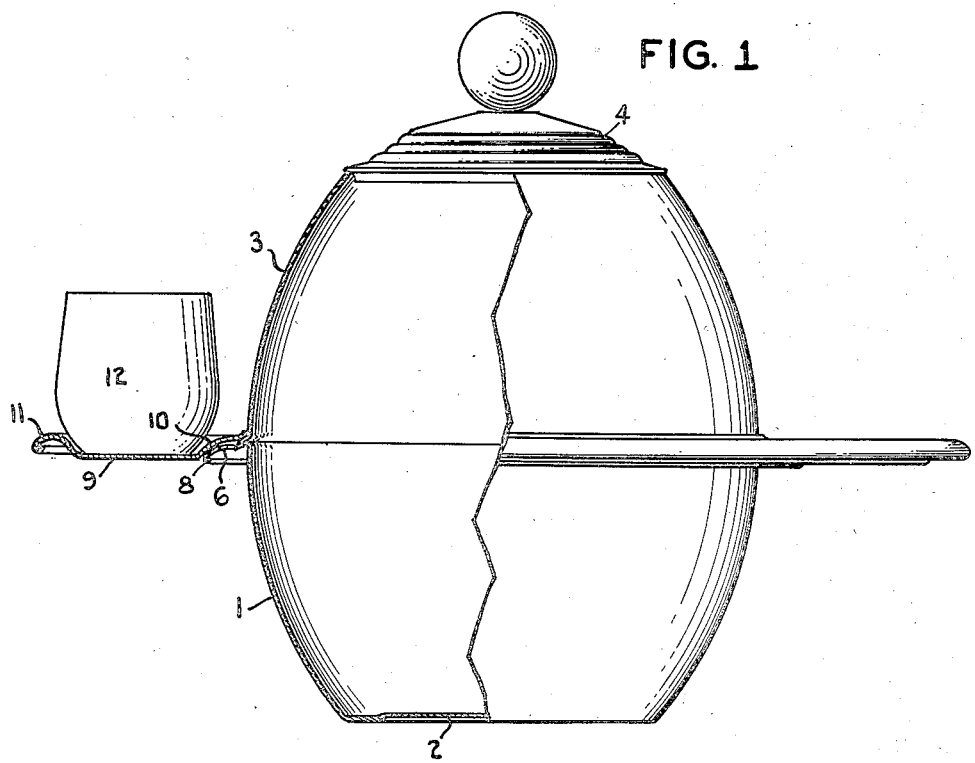
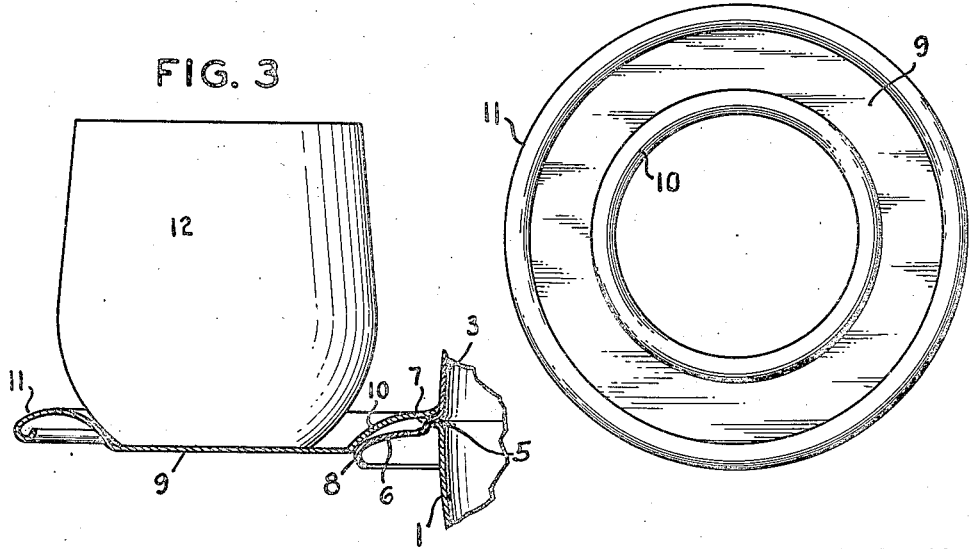
INVENTOR.
HARRY LEHMAN
BY
ATTORNEY.

Patented Oct. 13, 1936

2,056,943

UNITED STATES PATENT OFFICE 2,056,943

COMBINED BEVERAGE CONTAINER AND SERVING TRAY

Harry Lehman, Brooklyn, N. Y.

Application December 3, 1935, Serial No. 52,656

5 Claims. (Cl. 65—15)

My invention relates to a combined beverage container and removable service tray.

It is one object of my invention to provide a beverage container of substantial size which shall be self-supporting and have mounted thereon a service tray for holding the glasses or cups to be filled from the beverage container.

It is another object of my invention to provide a combined beverage container and serving tray in which the service tray will be mounted upon the beverage container in a position that is most convenient for the filling of the cups or glasses and placing the same upon the tray.

It is a further object of my invention to provide a structure of the above indicated character in which the service tray is firmly supported upon the beverage container so that it will not tilt or wobble and yet which can be simply and easily lifted off the beverage container for serving purposes.

It is a still further object of my invention to provide a structure of the above indicated character which shall be rugged and firm in construction, yet light in weight and susceptible of quantity production manufacture.

Other and further objects of my invention will be apparent from the following specification, taken in conjunction with the accompanying drawing, wherein—

Figure 1 is a side elevation with parts broken away and sectionalized to facilitate the illustration;

Fig. 2 is a plan view of the band-like service tray; and

Fig. 3 is an enlarged detail showing the relationship of the projecting collar and the service tray.

Referring to the drawing, the beverage container comprises a bowl formed of a sheet metal base 1, having a broad bottom 2 upon which the container rests, and a sheet metal shell 3, open at its top and adapted to be closed by a removable cover 4.

In the form which I have shown herein, the base 1 has a slight out-turned lip 5 at its upper edge. The shell 3 has a flange or projecting collar 6 which, when the parts are assembled together, extends outwardly from the side of the beverage container to a substantial distance so as to provide a lip that can be gripped or used when moving the beverage container about from place to place. Near the juncture of the collar 6 and shell 3, there is an offset or upwardly projecting portion 7 which receives the lip 5, as is shown in the enlarged detail, Fig. 3.

The collar 6 is shaped but generally tapers or inclines downwardly a small degree and terminates in a rolled or curved outer edge 8.

When the container is assembled in manufacture, the shell 3 is placed upon the base 1 with the lip 5 in the offset 7 and the parts are sealed together as by soldering or welding, or in any other appropriate manner desired so as to render the beverage container leak-proof at this junction point, and to hold the parts together as one unit.

As a part of my invention I provide a service tray 9 which, as will be seen from Fig. 2, is shaped in the form of a band surrounding a central opening. In the construction I have arranged that the tray fits snugly about the beverage container and rests upon the collar 6.

The inner edge 10 of the band-like tray 9 is raised in the shape of an arc with the arc-shaped portion resting upon the offset 7 and the lower edge of the arc resting upon the curved outer edge 8 of the collar 6. Thus the tray 9 is firmly supported upon the collar, but there is nothing to interfere with easy lifting of the tray from off the container and its collar.

The base of the tray 9 is flat although of course it may have depressions therein for the reception of glasses or cups if desired. The outer rim of the tray is provided with a raised arc-shaped portion 11 which curves upwardly and outwardly and terminates in a bead.

I have shown one of the glasses or cups at 12 and it will be seen that the raised rim portions 10 and 11 of the tray 9 are of such a height that they will engage well up on the side of the glass 12, that is far enough, depending on the shape of the glass, so that the glass is held on the tray in the event the tray is tipped, even to a considerable degree, while it is being carried. As I have designed the marginal edges of the tray the same may be tipped to a considerable degree without danger of the glasses 12 falling therefrom.

It will be understood that the collar 6 may be located at any point intermediate the top and bottom of the container. In the drawing, I have shown this collar at about the center of the container. In manufacture I find that this is a convenient location for the particular type and height of cup or glass used with the container.

It will also be understood that the principles and features of construction shown and described herein may be embodied in containers of various shapes and sizes.

Modifications may be made in the arrangement and location of parts within the spirit and scope of my invention, and such modifications are intended to be covered in the appended claims.

I claim:

1. A beverage container comprising a body portion having a movable closure and carrying an outwardly projecting collar located intermediate the top and bottom of the body portion, and a removable service tray adapted to be supported upon said collar and having an internal opening at least as large as the largest diameter of said body portion.

2. A beverage container comprising a body portion having a movable closure and carrying an outwardly projecting collar located intermediate the top and bottom of the body portion, and a removable tray fitting snugly about the body portion adjacent the collar and at least partly supported upon said collar, said tray having an opening at least as large as the largest diameter of said body portion from the place of support upwardly to the top of the container.

3. A beverage container comprising a body portion having a movable closure and carrying an outwardly projecting collar located intermediate the top and bottom of the body portion, said collar having a raised portion adjacent the container and another raised portion adjacent the outer edge of the collar, and a removable tray adapted to be supported by said collar and resting upon the raised portions thereof.

4. A beverage bowl comprising a sheet metal base member, a sheet metal shell member supported upon the base and having an open top, one of said members carrying an outwardly projecting collar at the point of juncture of the shell and base members, a movable cover for closing the top, and a band-like service tray of sheet metal shaped so as to fit about the beverage container and having a portion adapted to rest upon said collar, but being capable of ready lifting from off the container.

5. A keg-shaped bowl, a collar mounted on the bowl intermediate the top and bottom thereof, and a ring-shaped tray supported upon said collar and having an internal diameter sufficient to enable the tray to pass over the bowl to a position to be supported by said collar.

HARRY LEHMAN.